United States Patent
Takeuchi et al.

(10) Patent No.: US 6,289,929 B1
(45) Date of Patent: Sep. 18, 2001

(54) PRESSURE CONTROL VALVE FOR FUEL TANK

(75) Inventors: Yukihiko Takeuchi, Handa; Yasunori Kobayashi, Toyohashi, both of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/662,115

(22) Filed: Sep. 14, 2000

(30) Foreign Application Priority Data

Sep. 30, 1999 (JP) .................................................. 11-279064

(51) Int. Cl.[7] .................................................... F02M 37/04
(52) U.S. Cl. ............................ 137/587; 123/516; 123/520
(58) Field of Search ............................. 137/587; 123/516, 123/518, 520

(56) References Cited

U.S. PATENT DOCUMENTS

| | | | |
|---|---|---|---|
| 5,234,022 | * | 8/1993 | Harris ..................................... 137/498 |
| 5,429,099 | * | 7/1995 | DeLand ................................. 123/520 |
| 5,749,349 | * | 5/1998 | Detweiler et al. .................... 123/520 |
| 5,853,018 | * | 12/1998 | DeLand et al. ........................ 137/15 |
| 5,941,218 | * | 8/1999 | DeLand et al. ........................ 123/520 |

FOREIGN PATENT DOCUMENTS

| | | |
|---|---|---|
| 6050447 | 2/1994 | (JP) . |
| U-62-62077 | 9/1994 | (JP) . |
| 8 121619 A | 5/1996 | (JP) . |
| 8270515 | 10/1996 | (JP) . |

\* cited by examiner

*Primary Examiner*—A. Michael Chambers
(74) *Attorney, Agent, or Firm*—Nixon & Vanderhye PC

(57) ABSTRACT

A valve controlling a fuel tank pressure is disposed in a passage connecting the fuel tank and a canister that communicates with atmosphere. The control valve includes a first valve for introducing an atmospheric pressure into the fuel tank when the fuel tank pressure becomes negative and a second valve for releasing an excessively high pressure in the fuel tank. The first valve opens when the fuel tank pressure drops below a predetermined level and closes again when the fuel tank pressure is recovered. To prevent a vibrating operation of the first valve between its open and closed positions, the closing operation of the once opened valve is delayed by an orifice formed through a diaphragm of the valve. The orifice alleviates a quick change of the pressure applied to one surface of the valve. A magnet to restrict the quick movement of the valve may be used in place of the orifice. Preferably, an electromagnetic driver for forcibly opening the first valve, irrespective of the fuel tank pressure, is connected to the first valve.

16 Claims, 3 Drawing Sheets

PRESSURE CONTROL VALVE FOR FUEL TANK

CROSS-REFERENCE TO RELATED APPLICATION

This application is based upon and claims benefit of priority of Japanese Patent Application No. Hei-11-279064 filed on Sep. 30, 1999, the content of which is incorporated herein by reference.

BACKGROUND OF THE INVENTION

1. Field of the Invention

The present invention relates to a pressure control valve for controlling a pressure in a fuel tank, such as a fuel tank of an automotive vehicle.

2. Description of Related Art

A pressure control valve is disposed in a passage connecting a fuel tank of an automotive vehicle to an atmospheric pressure to prevent excessive negative pressure from being developed in the fuel tank. The atmospheric pressure is supplied, for example, from a drain port of a canister that temporarily holds fuel vapor generated in the fuel tank and suppresses fuel vapor exhaust from the fuel tank.

An example of such a pressure control valve is disclosed in JP-A-8-121619. The control valve includes a wall separating a valve chamber from a canister port and a valve body disposed in the valve chamber. A through-hole formed in the separating wall is opened or closed by the valve body according to a difference between the fuel tank pressure and an atmospheric pressure. The valve body is biased by a spring in a direction to close the through-hole. The valve chamber always communicates with a fuel tank port, and a canister inner pressure is applied to a front surface of the valve body while a fuel tank inner pressure is applied to a back surface of the valve body. When the fuel tank inner pressure decreases to a predetermined level, the valve body opens the through-hole to introduce atmospheric pressure into the fuel tank. The valve body is formed by connecting a dish-shaped metallic member to a rubber disc. A circular lip portion is formed on the rubber disc to tightly close the through-hole.

Another example of the valve device for preventing the fuel tank pressure from becoming excessively negative is disclosed in JP-A-6-50447. In this device, a hole communicating with atmosphere is formed in a top plate of a fuel tank cap, and the hole is usually closed by a valve body disposed inside the top plate. The valve body is biased by a spring in a direction to close the hole. When the fuel tank pressure decreases to a predetermined level, the valve body opens the hole against the biasing force of the spring to introduce the atmospheric pressure into the fuel tank. The valve body is composed of a cup-shaped rubber member having a circular sealing lip to tightly close the hole.

There is a problem in both of the conventional pressure control valves. When the atmospheric pressure is once introduced into the fuel tank through the open valve, the atmospheric pressure is immediately applied to the inner surface of the valve body. Accordingly, the open valve is instantly closed, and the negative pressure quickly develops in the fuel tank to open the valve again. This results in a vibrating operation of the valve between its closed and open positions with a short cyclic period. The vibrating operation of the valve generates vibrating noise.

SUMMARY OF THE INVENTION

The present invention has been made in view of the above-mentioned problem, and an object of the present invention is to provide an improved pressure control valve in which the valve vibration and the vibrating noise are prevented.

A pressure control valve having a first valve and a second valve is disposed in a passage connecting a fuel tank and a canister. The first valve opens to introduce an atmospheric pressure through the canister into the fuel tank when the fuel tank pressure becomes negative and lower than a predetermined level. The second valve opens to release the fuel tank pressure to the atmosphere through the canister when the fuel tank pressure becomes higher than a predetermined level.

The first valve is made of a rubber material partially reinforced by a metal disc, and includes a seal member and a diaphragm formed around the seal member. The atmospheric pressure is applied to a front surface of the first valve through the canister, while the fuel tank pressure is applied to a back surface through an orifice formed in the diaphragm. The first valve is normally biased to its closing position by a spring. When a vehicle stops and fuel temperature in the fuel tank drops, a negative pressure is developed in the fuel tank. At this time, the first valve opens to introduce the atmospheric pressure into the fuel tank, thereby alleviating the negative pressure in the fuel tank. Though the pressure in the fuel tank increases upon opening the first valve, the pressure applied to the back surface of the first valve does not immediately increase because that pressure is applied through the orifice having a small diameter. Accordingly, the first valve once opened does not close immediately. Thus, the first valve is prevented from being vibrated between its open and closed positions with a short cyclic time. The noise otherwise caused by such a vibration is prevented.

Alternatively, a magnet is used in place of the orifice to delay the closing operation of the first valve. The magnet is placed to face a moving core connected to the first valve to magnetically attract the moving core and thereby to restrict a quick closing movement of the first valve.

Preferably, an electromagnetic driver is connected to the first valve to move the first valve to its open position, irrespective of the pressure in the fuel tank. Upon energization of the electromagnetic driver, the first valve is forcibly open to make a bypass passage between the fuel tank and the atmosphere. The bypass passage is readily formed, when needed, without providing a separate device.

According to the present invention, the closing operation of the first valve once opened is delayed, and thereby the vibration and the vibrating noise of the first valve are prevented.

DETAILED DESCRIPTION OF THE PREFERRED EMBODIMENTS

Figure 1:
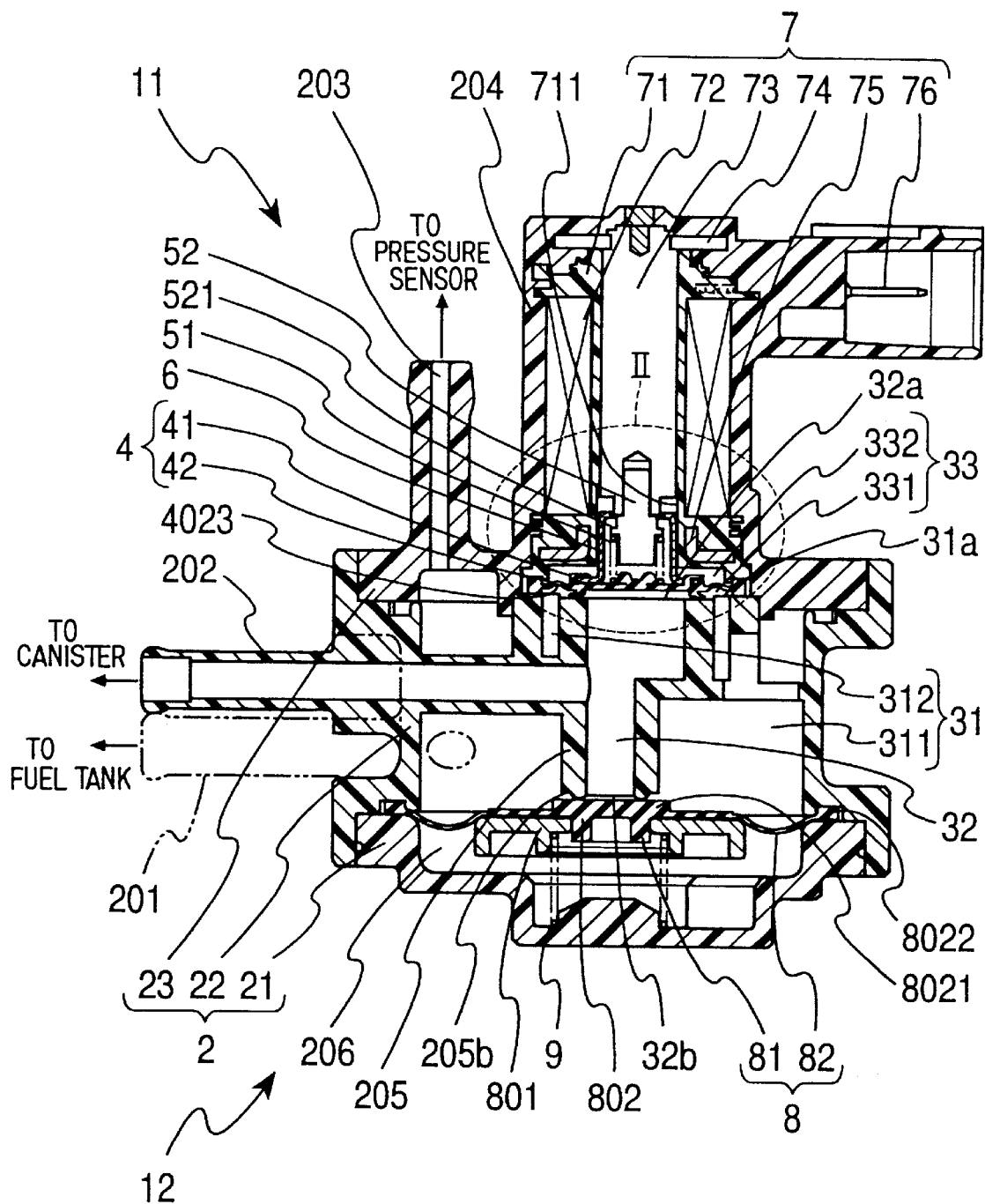
FIG. 1 is a cross-sectional view showing a pressure control valve as a first embodiment of the present invention.
Figure 2:
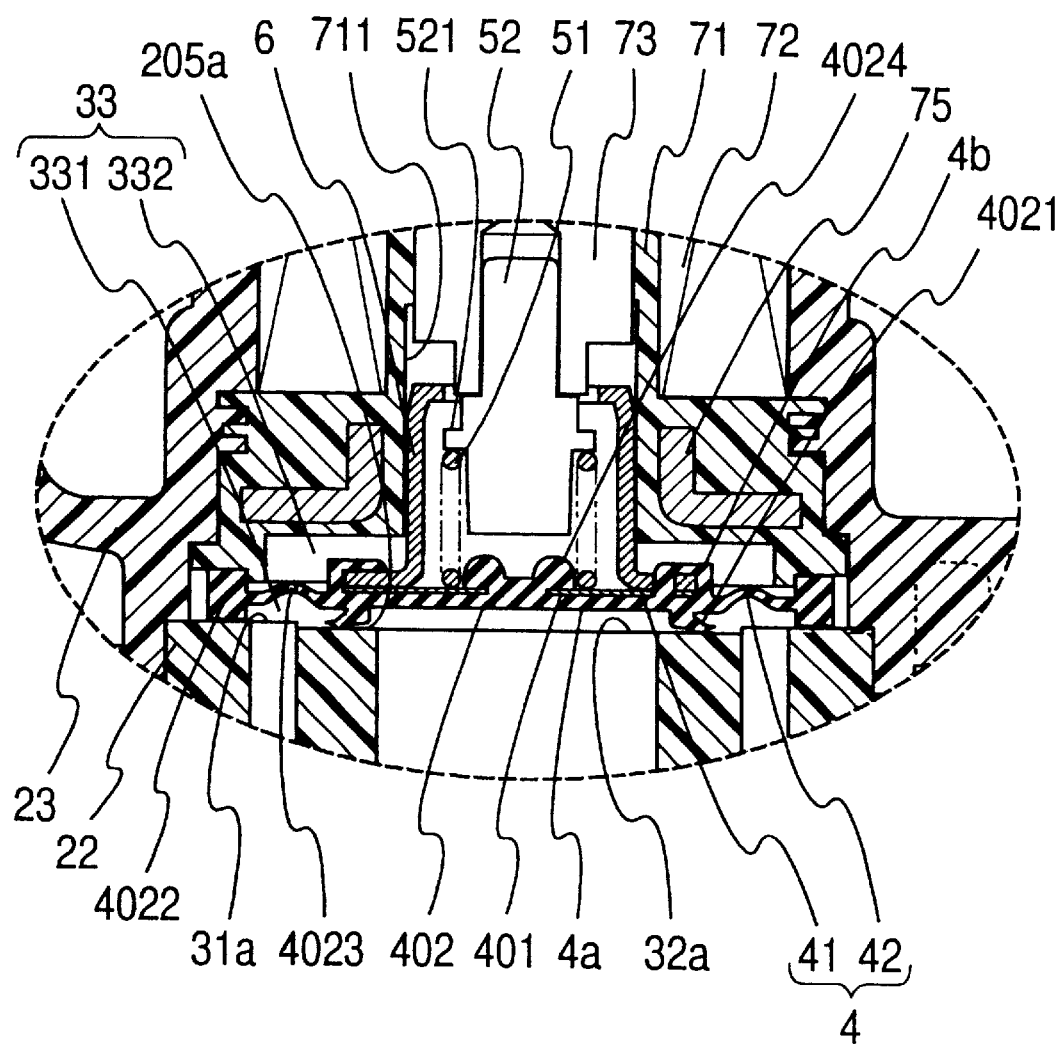
FIG. 2 is an enlarged cross-sectional view showing a first valve portion of the pressure control valve, a portion shown in a circle II in FIG. 1.

A first embodiment of the present invention will be described with reference to FIGS. 1 and 2. An entire structure of a pressure control valve is shown in FIG. 1. The pressure control valve is disposed in a passage connecting a fuel tank to a canister that temporarily holds fuel vapor therein and supplies an atmospheric pressure to the fuel tank. The pressure control valve includes a first valve 11 for connecting the fuel tank and the canister to introduce an atmospheric pressure into the fuel tank when a pressure in the fuel tank becomes negative and a second valve 12 for connecting the fuel tank and the canister to release the fuel tank pressure when the fuel tank pressure increases to a predetermined level. The first valve 11 also includes an electromagnetic driver portion 7 that opens the first valve to establish a bypass passage between the fuel tank and the canister, irrespective of a pressure difference between the fuel tank and the atmosphere.

The first and the second valves 11, 12 are contained in a common housing 2 consisting of three portions 21, 22 and 23. Upper and lower openings of a cylindrical side wall 22 are closed with a cap member 23 and a bottom member 21, respectively, thereby forming the housing 2. The cap member 23 includes a projected portion 204 in which the electromagnetic driver portion 7 is housed. The side wall 22 includes a canister port 202 connected to the canister and a fuel tank port 201 connected to the fuel tank. Both ports 201 and 202 stick out from the outer periphery of the side wall 22.

An inside of the housing 2 is divided into two chambers, a fuel tank pressure chamber 31 and an atmospheric pressure chamber 32, by a cylindrical separating wall 205. The fuel tank pressure chamber 31 connected to the fuel tank port 201 is formed outside the atmospheric pressure chamber 32 connected to the canister port 202. The fuel tank pressure chamber 31 includes a space 311 and a circular passage 312 formed at an inner periphery of the space 311 and communicating therewith.

The structure of the first valve 11 will be described with reference mainly to FIG. 2 that illustrates details of the first valve 11 in an enlarged scale. The projected portion 204 of the cap member 23 is positioned above both chambers 31, 32 and contains the electromagnetic driver portion 7 therein. A bobbin 71 is inserted into the projected portion 204. A valve chamber 33 in which a valve body 4 is disposed is formed between a lower end of the bobbin 71 and an upper end of the separating wall 205. The valve body 4 is disposed in the valve chamber 33, so that it faces an opening 31a of the fuel tank pressure chamber 31 and an opening 32a of the atmospheric pressure chamber 32.

The valve body 4 is formed by molding rubber 402 on a metal disc 401 that reinforces a center portion of the valve body 4. The valve body 4 includes a seal member 41 formed at the center portion and a diaphragm 42 formed at the peripheral portion. A circular lip 4021 projecting downwardly from the rubber 402 is formed at outer periphery of the seal member 41. The lip 4021 contacts an upper end surface 205a of the separating wall 205 to tightly close the opening 32a of the atmospheric pressure chamber 32. The thin diaphragm 42 made of rubber encircles the seal member 41.

A thicker periphery 4022 is formed to encircle the diaphragm 42 and is held between the bobbin 71 and the side wall 22. The valve chamber 33 is divided into two chambers, a first valve chamber 331 and a second valve chamber 332, by the valve body 4. The fuel tank pressure chamber 31 communicates with the first valve chamber 331, and the opening 31a of the fuel tank pressure chamber 31 is closed by the diaphragm 42 having the lip 4021 and the thicker periphery 4022. A hole having a diameter of about 0.4 mm is formed through the diaphragm 42, so that it serves as an orifice 4023. The second valve chamber 332 communicates with the first valve chamber 331 through the orifice 4023. Projections 4024 are formed on the seal member 41 so that they stick out upward. The projections 4024 abut against a lower surface of a stopper piece 52 fixed in the bobbin 71 when the valve body 4 moves upward to open the valve. The upward movement of the valve body 4 is limited by the stopper piece 52, and the abutting shock is alleviated by the projections 4024 made of rubber.

A hole 711 is formed in the bobbin 71, and a moving core 6 fixedly connected to the metal disc 401 is slidably supported in the hole 711. The cylinder-shaped moving core 6 made of iron has a flange portion at its bottom end, and the flange portion is welded to the metal disc 401. A stator core 73 is fixedly supported in the hole 711 above the moving core 6. The stopper piece 52 is fixedly inserted into a center hole of the stator core 73, and a lower portion of the stopper piece 52 sticks out from the stator core 73. A ring-shaped spring stopper 521 is formed on the lower portion of the stopper piece 52. A spring 51 is disposed between the spring stopper 521 and the seal member 41 in the compressed state, so that the valve body 4 is downwardly biased to close both openings 31a, 32a.

The electromagnetic driver portion 7 contained in the projected portion 204 is structured as follows. As better seen in FIG. 1, a coil 72 is wound around the bobbin 71, to which electric current is supplied from a terminal 76. A yoke 74 connected to a top portion of the stator core 73 is held in the projected portion 204. A magnetic plate 75 held in a bottom flange of the bobbin 71 is disposed surrounding the moving core 6. The coil 72, stator core 73, the yoke 74 and the magnetic plate 75 constitute a magnetic circuit. When the coil 72 is energized, the moving core 6 is electromagnetically pulled upward to lift the valve body 4 against the biasing force of the spring 51. Though the first valve 11 is designed to automatically open the openings 31a, 32a when the excessive negative pressure is developed in the fuel tank pressure chamber 31, the first valve 11 can be opened by operation of the electromagnetic driver 7, irrespective of the pressure in the fuel tank, thereby to establish communication between the fuel tank and the atmosphere. A pressure sensor port 203 communicating with the fuel tank pressure chamber 31 sticks out upwardly from the cap member 23. A pressure sensor (not shown) is connected to the pressure sensor port 203 for monitoring hermetical quality of a fuel tank system.

Referring to FIG. 1, the second valve 12 will be described. The second valve 12 is substantially the same as a known diaphragm valve. An inner cavity 206 is formed in the bottom member 21 that closes the bottom opening of the side wall 22. A second valve body 8 is disposed in the cavity 206. The second valve body 8 is composed of a seal member 81 formed at its center portion and a diaphragm 82 formed around the seal member 81. The seal member 81 made of rubber 802 is reinforced by attaching a resin disc 801 underneath the seal member 81. The seal member 81 includes a flat portion 8021 having a diameter larger than that of a bottom surface 205b of the separating wall 205. A bottom opening 32b of the atmospheric pressure chamber 32 is closed by the flat portion 8021.

The thin diaphragm 82 made of rubber is formed around the seal member 81, and a thick periphery 8022 is formed around the diaphragm 82. The thick periphery 8022 is firmly held between the side wall 22 and the bottom member 21, and thereby the second valve body 8 defines a bottom end of the fuel tank pressure chamber 31. A spring 9 biasing the seal member 81 upward is disposed between the resin disc 801 and the bottom member 21 in a compressed state.

The first valve 11 structured as described above operates as follows. The atmospheric pressure in the atmospheric pressure chamber 32 is applied to a front surface (lower surface) 4a of the valve body 4 facing the opening 32a, while the pressure in the fuel tank pressure chamber 31 is applied to a back surface (upper surface) 4b of the valve body 4 through the orifice 4023 formed in the diaphragm 42. When a vehicle stops, the temperature of fuel in the fuel tank decreases, and thereby the pressure in the fuel tank becomes negative. At this time, because the negative pressure is applied to the back surface 4b of the valve body 4, the valve body 4 moves upward against the biasing force of the spring 51. Accordingly, the opening 32a of the atmospheric pressure chamber 32 opens to communicate with the opening 31a of the fuel tank pressure chamber 31. The atmospheric pressure is introduced into the fuel tank pressure chamber 31 from the atmospheric pressure chamber 32.

Upon introduction of the atmospheric pressure into the fuel tank pressure chamber 31, the negative pressure therein starts to be alleviated. The negative pressure alleviation starts from an immediate downstream of the lifted lip 4021, i.e. from an outside periphery of the lip 4021 in the first valve chamber 331. The negative pressure in the second valve chamber 332 is also alleviated because the second valve chamber 332 communicates with the first valve chamber 331 through the orifice 4023.

However, speed of the negative pressure alleviation in the second valve chamber 332 is slower than that in the first valve chamber 331, because both chambers communicate with each other only through the orifice 4023 having a small opening. Therefore, the negative pressure in the second valve chamber 332 is kept for a certain period of time after the atmospheric pressure is introduced into the first valve chamber 331. If the atmospheric pressure were applied to the back surface 4b of the valve body 4 immediately after the valve is opened as in the conventional valve device, the valve would be closed again before the negative pressure in the fuel tank is sufficiently alleviated. This would cause vibration of the valve between open and closed positions. Since the negative pressure alleviation in the second valve chamber 332 is delayed according to the present invention, repetition of opening and closing of the valve with a short cycle time is surely avoided and noises due to the vibration are prevented.

The second valve 12 opens to establish communication between the fuel tank pressure chamber 31 and the atmospheric pressure chamber 32 when the pressure in the chamber 31 exceeds a level determined by the biasing force of the spring 9. In other words, when the fuel tank pressure becomes excessively high, the high pressure is released to the atmosphere through the second valve 12.

To establish communication between the canister port 202 and the fuel tank port 201, irrespective of the pressure in the fuel tank, the first valve 11 is forcibly opened by energizing the electromagnetic driver 7.

Though the second valve chamber 332 communicates with the fuel tank pressure chamber 31 through the orifice 4023 in the embodiment described above, it is possible to form a passage having an orifice, in place of the orifice 4023, in the housing to establish communication between the second valve chamber 332 and the fuel tank pressure chamber 31.

Figure 3:
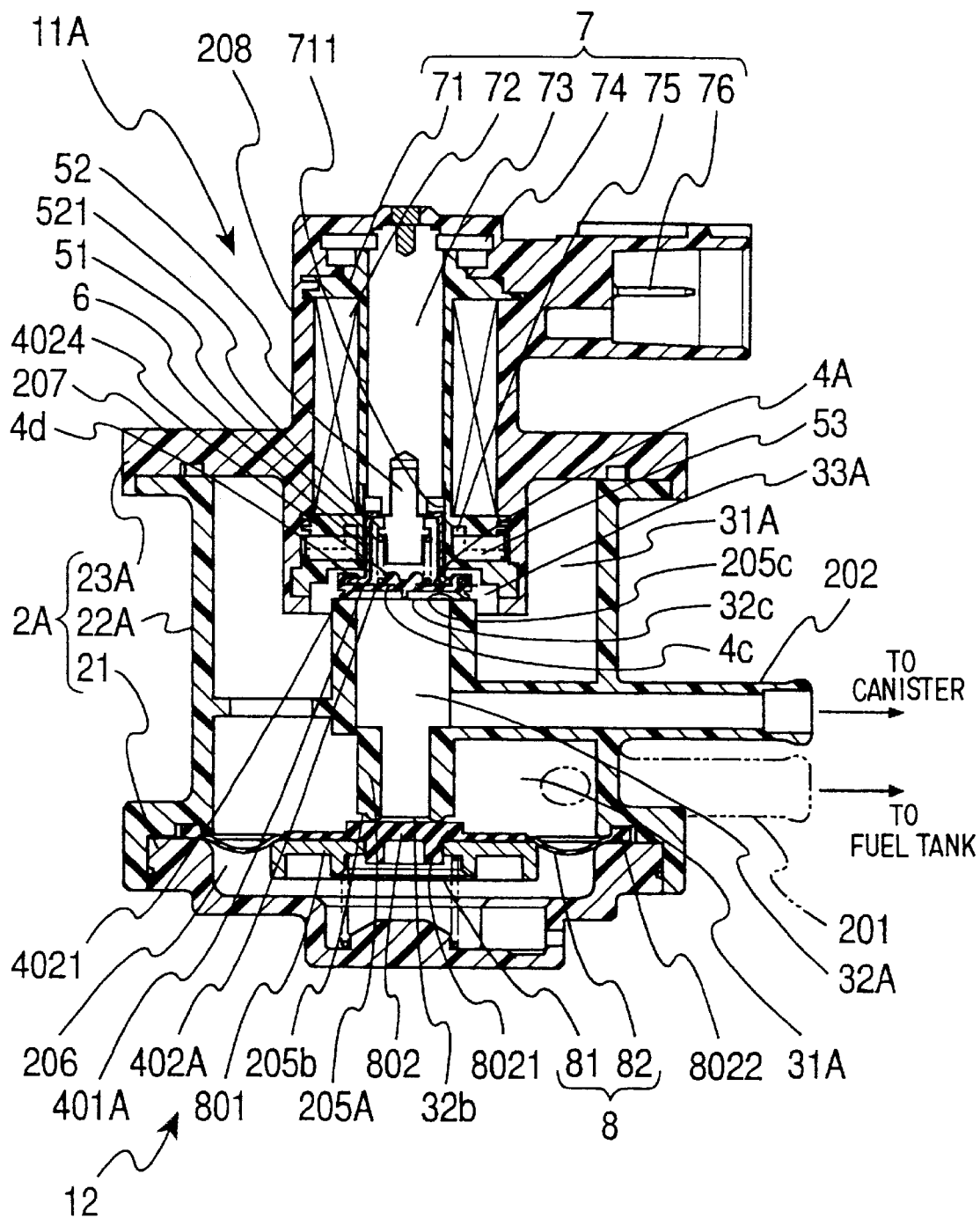
FIG. 3 is a cross-sectional view showing a pressure control valve as a second embodiment of the present invention.

A second embodiment of the present invention will be described with reference to FIG. 3. In the second embodiment, the first valve 11 of the first embodiment is replaced with a first valve 11A, and the second valve 12 remains unchanged. Since most structures and operation are the same as those of the first embodiment, only the differences from the first embodiment will be described below.

The housing 2A is composed of three members, 21, 22A and 23A. Both open ends of a cylindrical side wall 22A having an oval cross-section are closed with a cap member 23A and the bottom member 21 in the same manner as in the first embodiment. The cap member 23A includes a cylindrical portion 208 in which the electromagnetic driver portion 7 is contained. The inner space of the housing 2A is divided into two chambers, a fuel tank pressure chamber 31A communicating with the fuel tank port 201 and an atmospheric pressure chamber 32A communicating with the canister port 202.

The structure of the first valve 11A will be described. The cap member 23A includes a flange 207 and a cylindrical portion 208 extending upwardly from the flange 207. The cylindrical portion 208 is formed coaxially with the separating wall 205A and contains the electromagnetic driver portion 7 therein. The diameter of the cylindrical portion 208 is larger than that of the separating wall 205A. The bobbin 71 is inserted in the cylindrical portion 208, and a valve chamber 33A is formed between the lower surface of the cylindrical portion 208 and the upper surface 205c of the separating wall 205A. A valve body 4A is disposed in the valve chamber 33A to face an opening 32c of the atmospheric pressure chamber 32A. The valve body 4A is composed of a rubber member 402A having a diameter a little larger than that of the opening 32c and a metal disc 401A reinforcing the rubber member 402A. A circular lip 4021 is formed on the lower surface of the rubber member 402A to contact the upper surface 205c and thereby to close the opening 32c.

The fuel tank pressure is applied to the back surface (upper surface) 4d of the valve body 4A through a circular space between the separating wall 205A and the cylindrical portion 208. The atmospheric pressure is applied to the front surface (lower surface) 4c of the valve body 4A.

The valve body 4A is downwardly biased by the spring 51 to close the opening 32c.

The moving core 6 fixed to the valve body 4A is slidably supported in an inner bore 711 of the bobbin 71. The valve body 4A can be electromagnetically driven by the electromagnetic driver 7 in the same manner as in the first embodiment.

A circular magnet 53 is disposed outside the moving core 6 with the bobbin 71 interposed therebetween. The circular magnet 53 is magnetized to form poles on its upper and lower surfaces.

The first valve 11A of the second embodiment operates as follows. As described above, the atmospheric pressure is applied to the front surface 4c of the valve body 4A, while the fuel tank pressure is applied to the back surface 4d of the valve body 4A. When the vehicle stops and the fuel temperature drops, the fuel tank pressure becomes negative, applying negative pressure to the back surface 4d of the valve body 4A. This generates a pressure difference between both surfaces 4c and 4d of the valve body 4A. The valve body 4A moves upward against the biasing force of the spring 51, and thereby the opening 32c opens. Thus, the atmospheric pressure chamber 32A communicates with the fuel tank pressure chamber 31A, and thereby the atmospheric pressure is introduced into the fuel tank.

Upon introduction of the atmospheric pressure into the fuel tank pressure chamber 31A, the negative pressure therein is alleviated first from the immediate downstream of the valve body 4A. As the negative pressure is alleviated, the valve tends to close again. However, since the circular magnet 53 disposed outside the moving core 6 attracts the moving core 6, the frictional force between the moving core 6 and the inner bore 711 of the bobbin 71 is generated. This frictional force is generated, because there are some unevenness of the magnetic field of the circular magnet 53 and a certain dimensional deviation in the clearance between the moving core 6 and the inner bore 711, and therefore the attractive force of the circular magnet 53 is not perfectly uniform around the entire periphery of the moving core 6. Because of the frictional force, the downward movement of the valve to close the opening 32c is delayed, and the valve vibration between the open and closed positions with a short cyclic period is avoided. Thus, the noise due to the valve vibration is also avoided.

The structure and operation of the second valve 12 of the second embodiment are the same as those of the first embodiment. That is, the fuel tank pressure becomes higher than a predetermined level, the second valve 12 opens to release the fuel tank pressure to the atmosphere. Also, the operation of the electromagnetic driver portion 7 in the second embodiment is the same as that in the first embodiment. That is, the communication between the fuel tank port 201 and the canister port 202 is forcibly established, irrespective of the pressure difference between two chambers 31A and 32A, by operation of the electromagnetic driver 7.

The circular magnet 53 may be replaced with a rod magnet placed at a side of the moving core 6. The magnetic field of the rod magnet and the distance between the rod magnet and the moving core 6 may be adjusted, so that a proper control force is given to the movement of the valve body 4A.

Though the first valve 11 operative in response to the fuel tank pressure is also forcibly operated by the electromagnetic driver 7 to make a bypass passage in both embodiments described above, the bypass passage may be formed by a valve device disposed separately from the first valve 11. Further, though the first valve 11 and the second valve 12 are housed in a common housing in the above embodiments, it is possible to separately dispose both valves. Though the pressure control valve having two valves 11 and 12 is disposed in the passage connecting the fuel tank to the canister in the above embodiments, it is possible to dispose the valve to relieve the negative pressure in a fuel tank cap.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A pressure control valve for controlling a fuel tank pressure comprising:
   a housing;
   an atmospheric pressure chamber, formed in the housing, communicating with an atmospheric pressure;
   a fuel tank pressure chamber, formed in the housing, communicating with a fuel tank pressure;
   a valve body, disposed in the housing, for opening or closing communication between the atmospheric pressure chamber and the fuel tank pressure chamber according to a pressure difference between said pressure chambers;
   a spring for biasing the valve body to its closed position; and
   means for delaying a closing operation of the valve body after the valve body first opens the communication between both pressure chambers against a biasing force of the spring.

2. The pressure control valve as in claim 1, further comprising an electromagnetic driver connected to the valve body, wherein:
   the valve body is operated to open the communication between both pressure chambers, irrespective of the pressure difference between both chambers, upon energization of the electromagnetic driver.

3. The pressure control valve as in claim 1, further comprising an electromagnetic driver connected to the valve body wherein:
   the valve body is operated to open the communication between both pressure chambers, irrespective of the pressure difference between both chambers, upon energization of the electromagnetic driver.

4. The pressure control valve as in claim 1, further comprising an electromagnetic driver connected to the valve body wherein:
   the valve body is operated to open the communication between both pressure chambers, irrespective of the pressure difference between both chambers, upon energization of the electromagnetic driver.

5. A pressure control valve for controlling a fuel tank pressure comprising:
   a housing;
   an atmospheric pressure chamber, formed in the housing, communicating with an atmospheric pressure;
   a fuel tank pressure chamber, formed in the housing, communicating with a fuel tank pressure;
   a valve chamber formed in the housing;
   a valve body having a front surface and a back surface, disposed in the valve chamber, for opening or closing communication between the atmospheric pressure chamber and the fuel tank pressure chamber according to a pressure difference between said pressure chambers, the front surface being exposed to the atmospheric pressure chamber and the back surface being exposed to the fuel tank pressure chamber; and
   a spring for biasing the valve body to a position to close communication between said pressure chambers, wherein:
      the valve chamber is divided by the valve body into a first valve chamber to which the fuel tank pressure is introduced and a second valve chamber communicating with the first valve chamber through an orifice formed in the valve body, so that a pressure change in the first valve chamber is gradually transferred to the second valve chamber through the orifice after the valve is first opened.

6. The pressure control valve as in claim 5, wherein:
   the valve body includes a seal member to close the communication between both pressure chambers and a circular diaphragm formed integrally with and around the seal member.

7. The pressure control valve as in claim 6, wherein:
   the orifice is a small hole formed through the diaphragm.

8. A pressure control valve for controlling a fuel tank pressure comprising:
   a housing;
   an atmospheric pressure chamber, formed in the housing, communicating with an atmospheric pressure;
   a fuel tank pressure chamber, formed in the housing, communicating with a fuel tank pressure;

a valve chamber formed in the housing;

a valve body having a front surface and a back surface, disposed in the valve chamber, for opening or closing communication between the atmospheric pressure chamber and the fuel tank pressure chamber according to a pressure difference between said pressure chambers, the front surface being exposed to the atmospheric pressure chamber and the back surface being exposed to the fuel tank pressure chamber;

a spring for biasing the valve body to a position to close communication between said pressure chambers; and a moving core connected to the valve body, the moving core being slidably movable according to opening and closing operation of the valve body, wherein:

a magnet is disposed to face the moving core with a space therebetween to magnetically attract the moving core to retard movement of the moving core and thereby to retard the closing operation of the valve body after the valve body is first opened.

9. The pressure control valve as in claim 8, further comprising an electromagnetic driver connected to the valve body, wherein:

the valve body is operated to open the communication between both pressure chambers, irrespective of the pressure difference between both chambers, upon energization of the electromagnetic driver.

10. A pressure control valve for relieving a negative pressure developed in a fuel tank to atmosphere comprising:

a housing;

an atmospheric pressure chamber, formed in the housing, communicating with an atmospheric pressure;

a fuel tank pressure chamber, formed in the housing, communicating with a fuel tank pressure;

a valve body, disposed in the housing, for opening communication between the atmospheric pressure chamber and the fuel tank pressure chamber when a pressure difference between said pressure chambers exceeds a predetermined amount, to relieve a negative pressure developed in the fuel tank pressure chamber to atmosphere;

a spring for biasing the valve body to a closed position for closing communication between the atmospheric pressure chamber and the fuel tank pressure chamber; and means for delaying a return of the valve body to said closed position after the valve body first opens communication between said pressure chambers against the biasing force of the spring.

11. The pressure control valve as in claim 10, wherein:

the valve body includes a seal member to close the communication between both pressure chambers and a circular diaphragm formed integrally with and around the seal member.

12. The pressure control valve as in claim 11, wherein said means for delaying comprise a small hole formed through the diaphragm.

13. The pressure control valve as in claim 11, wherein:

the valve body includes a seal member to close the communication between both pressure chambers and a circular diaphragm formed integrally with and around the seal member.

14. The pressure control valve as in claim 13, wherein said throttled flow communication is provided by a small hole formed through the diaphragm.

15. The pressure control valve as in claim 10, wherein said means for delaying comprises:

a moving core connected to the valve body, the moving core being slidably movable according to opening and closing operation of the valve body, and a magnet is disposed to face the moving core with a space therebetween to magnetically attract the moving core to retard movement of the moving core and thereby to retard the closing operation of the valve body after the valve body is first opened.

16. A pressure control valve for controlling a fuel tank pressure comprising:

a housing;

an atmospheric pressure chamber defined in the housing and communicating with atmospheric pressure;

a fuel tank pressure chamber defined in the housing for communication with a fuel tank;

a valve chamber formed in the housing;

a valve body for opening or closing communication between the atmospheric pressure chamber and the fuel tank pressure chamber according to a pressure difference between said pressure chambers, a spring for biasing the valve body to a position to close communication between said pressure chambers;

said valve body having a front surface and a back surface and said valve body dividing the valve chamber into a first valve chamber into which fuel tank pressure is introduced and a second valve chamber, said back face of said valve body being exposed to the second valve chamber, the first valve chamber being in throttled flow communication with said second valve chamber so that a pressure change in said first valve chamber is gradually transferred to the second valve chamber, whereby, after the valve body is first opened against a biasing force of the spring, a reclosing of said valve is delayed.

* * * * *